(12) United States Patent
Gertner-Hansen

(10) Patent No.: US 6,506,235 B1
(45) Date of Patent: Jan. 14, 2003

(54) METHOD OF CLEANING FLUE GASES

(75) Inventor: Jens Gertner-Hansen, Copenhagen (DK)

(73) Assignee: Alstom Power Holding AB, Finspang (SE)

(*) Notice: Subject to any disclaimer, the term of this patent is extended or adjusted under 35 U.S.C. 154(b) by 0 days.

(21) Appl. No.: 09/720,432

(22) PCT Filed: Jun. 14, 1999

(86) PCT No.: PCT/SE99/01044

§ 371 (c)(1),
(2), (4) Date: Feb. 23, 2001

(87) PCT Pub. No.: WO99/67010

PCT Pub. Date: Dec. 29, 1999

(30) Foreign Application Priority Data

Jun. 24, 1998 (SE) .............................................. 9802250

(51) Int. Cl.⁷ .............................................. B01D 53/06
(52) U.S. Cl. .............................. 95/107; 96/134; 96/150
(58) Field of Search .......................... 95/107, 111, 288, 95/90; 96/123, 150, 134

(56) References Cited

U.S. PATENT DOCUMENTS

| | | | |
|---|---|---|---|
| 3,485,014 A | * | 12/1969 | Atsukawa et al. |
| 3,574,562 A | * | 4/1971 | Kawwahata |
| 4,728,342 A | * | 3/1988 | Abom |
| 4,874,402 A | * | 10/1989 | Vogel |
| 5,505,766 A | * | 4/1996 | Chang |
| 5,514,356 A | * | 5/1996 | Lerner |
| 5,725,635 A | * | 3/1998 | Zubini et al. |
| 5,854,173 A | * | 12/1998 | Chang et al. |
| 5,855,651 A | * | 1/1999 | Kurita et al. |
| 6,051,054 A | * | 4/2000 | Ahman |
| 2002/0007731 A1 | * | 1/2002 | Steinke et al. |

FOREIGN PATENT DOCUMENTS

| | | | |
|---|---|---|---|
| DE | 3925818 | * | 2/1991 |
| EP | 0639400 | | 2/1995 |
| SE | 429008 | | 8/1983 |
| SE | 453570 | | 2/1988 |
| SE | 462551 | | 7/1990 |

* cited by examiner

*Primary Examiner*—Duane S. Smith
(74) *Attorney, Agent, or Firm*—Swidler Berlin Shereff Friedman, LLP

(57) ABSTRACT

A method of cleaning flue gases from gaseous pollutants formed during combustion of oil during start-up of a boiler and/or operational disturbances in the boiler, wherein the boiler is for combustion of fuel including one of fossil fuel, coal, biomass fuel and waste. Flue gases are conducted from the boiler through a flue duct to a barrier filter for seperation of particulate pollutants. Finely-dispersed particles are introduced into and mixed with the flue gases in the flue duct in at least one of upstream of and in the barrier filter. The finely-dispersed particles are separated in the barrier filter while forming a dust cake. Condensed gaseous pollutants and droplets are taken up on the surface of the finely-dispersed particles in the flue gases and in the dust cake.

11 Claims, 1 Drawing Sheet

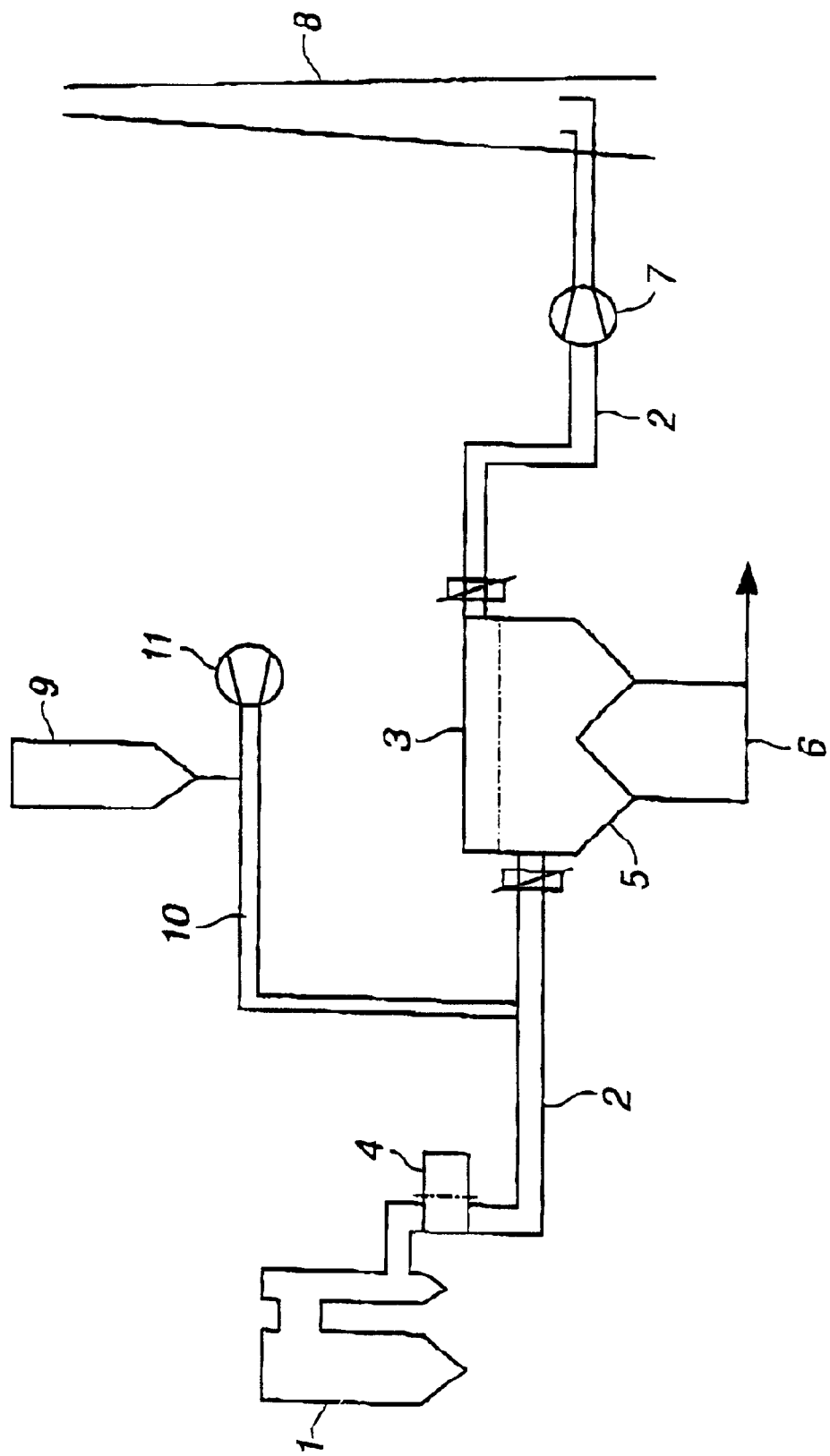

METHOD OF CLEANING FLUE GASES

FIELD OF THE INVENTION

The present invention relates to a method of cleaning flue gases from gaseous pollutants, formed during combustion of oil or the like, during start-up of a boiler for combustion of fossil fuel such as coal, biomass fuel or waste. According to the method, the flue gases are conducted from the boiler through a flue duct to a barrier filter, such as a bag filter, for separation of particulate pollutants.

BACKGROUND OF THE INVENTION

In a known method, the flue gases formed during start-up of the boiler, from combustion of, for example, oil in an oil starter burner, are by passed the bag filter and are discharged directly into the atmosphere. The start-up proceeds until the boiler has reached the required temperature, that is, usually when the temperature has risen from an ambient temperature of about 20° C. up to about 100–300° C., whereupon the stationary combustion in the boiler of, for example, coal may be initiated, and the bag filter be put into operation.

The flue gases formed during the start-up of the boiler contain particulate pollutants, such as soot, and gaseous pollutants, such as hydrocarbon and sulphur oxides, as well as water steam. Since both the boiler and the subsequently located flue-gas cleaning system are cold, that is, assume ambient temperature, during the start-up, the greater part of the gaseous pollutants of the flue gases condense. The condensate and small droplets which are thus formed consist primarily of hydrocarbon, sulphuric acid (formed by sulphur oxides) and water. The cold apparatus parts of the flue-gas cleaning system substantially consist of it bag filter and flue ducts, and of an economiser (energy recovery stage) and an air preheater associated with the boiler. If the boiler has previously been in operation, which is normally the case, a considerable part of the pollutants emanate also from dust in the form of soot and fly ash, which have become deposited in the boiler and its channels during operation thereof. This dust loosens in connection with the start-up and accompanies the flue gases out into the atmosphere. Also emission of pollutants when switching to filter operation immediately after the stationary coal firing has been started usually occurs, since this switching takes a certain period of time. A start-up usually takes between 0.5 and 10 hours, so a considerable quantity of pollutants are discharged into the atmosphere before the bag filter is put into operation arid the coal firing has been started. During the start-up of, for example, a medium-sized power plant (300 MW), in addition to the above-mentioned gaseous pollutants, up to about 500 kg of dust may be emitted. These pollutants, of course, constitute a major environmental problem. The method also results in an unattractive plume of flue gases, coloured by the oil soot, leaving the smoke stack.

The requirements of the authorities on the emission level from, for example, plants where fossil fuels are burnt are directed both to the total emission quantity and to a maximum emission limit value. These requirements have lately become increasingly stricter in many countries, and for this reason it is often necessary nowadays to conduct the flue gases, formed during start-up of the boiler directly to the bag filter. However, this known method unfortunately results in problems for the filter bags of the bag filter. The filter bags are damaged by the condensate and the droplet which are formed by the gaseous pollutants of the flue gases and their water steam in that these clog and "cement" the filter bags during the start-up. This leads to a very rapid pressure drop across the filter bags, which necessitates a considerably more vigorous and frequent cleaning of the filter. After only about 10 start-ups, a filter bag may therefore be totally destroyed and must thus be replaced. This leads to a very short service life for the filter bags of the bag filter. In addition, the filter cages arranged in the filter bags are rapidly subjected to corrosion in this very moist environment caused by the condensate and the droplets. This corrosion is particularly manifest if a large number of start-ups have to be made during a short period of time. The extensive service and maintenance work which is caused thereby results in this method becoming very expensive.

SUMMARY OF THE INVENTION

In the light of what has been stated above, the object of the present invention is to achieve, during start-up of a boiler, for burning fossil fuel, biomass fuel or waste, a simple and inexpensive method for cleaning flue gases, whereby the effect of condensed gaseous pollutants and droplets is eliminated or at least considerably reduced.

The above object is achieved according to the present invention with a method of a kind described in the introductory part of the description and characterized in that finely-dispersed particles, preferably from fly ash, are introduced into and mixed with the flue gases in the flue duct upstream of and/or in the barrier filter, and that the finely-dispersed particles are separated in the barrier filter while forming a dust cake, whereby condensed gaseous pollutants and droplets, especially consisting of hydrocarbon, sulphuric acid and water, are taken up on the surface of the finely-dispersed particles in the flue gases and in the dust cake formed.

The basic inventive concept is thus that the finely-dispersed particles, supplied to the flue gases, are to take up the condensate and the droplets which are formed during start-up of a boiler during combustion of oil or the like, such that the textile filter is not damaged by clogging and/or "cementing".

The finely-dispersed particles are suitably introduced in an amount which is in the interval of 1–500 g/Nm$^3$, especially 5–50 g/Nm$^3$, of flue gas. The particles particularly consist or fly ash and/or bottom ash from the boiler, but may also consist of other finely-dispersed particles which have corresponding properties of taking up condensed gaseous pollutants and droplets.

The finely-dispersed particles are preferably taken from an external storage container, such as a silo. In the event that fly ash is used, this may alternatively be taken directly from at least one of the dust hoppers associated with the barrier filter, whereas in the event that bottom ash from the boiler is used, this may alternatively be taken directly from the boiler.

According to an alternative embodiment of the invention, the finely-dispersed particles nay be introduced into and mixed with the flue gases upstream of an air preheater associated with the boiler.

BRIEF DESCRIPTION OF THE DRAWING

The invention will now be described in greater detail with reference to the accompanying drawing, which very schematically shows a plant for carrying out a method according to the present invention.

DETAILED DESCRIPTION OF THE INVENTION

In a boiler 1 for coal firing, oil is burnt during start-up with the aid of oil starter burners (not shown) associated with the boiler. The start-up process proceeds until the boiler 1 has reached a temperature required for stationary coal firing, which usually takes several hours. The flue gases which are formed from the oil combustion contain particulate pollutants, such as soot and fly ash, and gaseous pollutants, such as hydrocarbon and sulphur oxides, but also detached dust deposited in the boiler and its ducts during previous operation thereof.

The flue gases are conducted from the boiler 1 via a flue duct 2 to a bag filter 3 for separation of the particulate pollutants which are present in the flue gases and which are formed. An air preheater 4 is connected (not shown) to the boiler 1 to transfer heat from the hot flue gases to the combustion air of the boiler. The particulate pollutants are separated on the filter bags in the bag filter 3 while forming a dust cake and are collected in dust hoppers 5 provided in the bottom of the filter, whereby the pollutants are discharged via a conduit 6 to a storage container, not shown in the figure. From the bag filter the cleaned flue gases are conducted through the flue duct 2 and via a fan 7 for feeding the flue gases before they are finally emitted into the atmosphere through a smoke stack 8.

During start-up of the boiler 1, oil is burnt as described above. The major part of the gaseous pollutants of the flue gases and their water steam condense during this start-up and form condensate and droplets due to the fact that both the boiler and the subsequent flue-gas cleaning system are cold, that is to say, adopt ambient temperature, during the start-up. The cold apparatus parts of the flue-gas cleaning system consist substantially of the flue duct 2 and the bag filter 3 as well as an economizer and an air preheater 4, respectively, associated with the boiler. The amount of condensate and droplets formed is determined by the temperature of the boiler and the apparatus parts of the cleaning system. The condensate and the droplets consist primarily of hydrocarbon, sulphuric acid and water. With oil burning during the start-up process, only a very small quantity of dust particles is formed, compared with the quantity of dust particles during stationary operation with coal firing. This implies that the quantity of particles on which the condensate and the droplets may become deposited according to known technique is, in principle, negligible. The condensate and the droplets are instead deposited directly on the filter bags in the bag filter such that a sticky mass is formed, which significantly damages the bags by clogging and "cementing". This thus rapidly destroys the function of the bag filter. The present invention is therefore directed to solving this problem.

During start-up of the boiler 1, the fan 7 is started, whereby atmospheric air is passed through the whole flue-gas cleaning system. The bag filter 3 is then put into operation and during this period also the injection of finely-dispersed fly ash is started. This is achieved by starting a pneumatic transport system 11 for the fly ash and the emptying system of the silo 9. The fly ash is supplied to the flue duct 2 upstream of the bag filter 3, as schematically shown in the figure. The fly ash is thus taken from a silo 9, which is connected to a conduit 10 and is blown by means of compressed air according to conventional technique via the conduit 10 into the flue duct 2. The fly ash which is blown into the flue duct 2 is dispersed and nixed homogeneously with the flue gazes. According to the present embodiment, the quantity of finely-dispersed fly ash blown into the flue duct 2 is in the interval of 5–10 g/Nm$^3$. This quantity is chosen with respect to the actual quantity of condensate in the flue gases and corresponds to the quantity of dust particles in the flue gases which are formed during stationary coal firing. The fly ash is led into the bag filter 3 and is separated on the filter bags of the bag filter. The fly-ash particles are distributed uniformly over the filter bags by the pressure equalization which occurs in the bag filter 3. When the filter bags are completely covered with the fly-ash particles, that is, when an incipient dust cake has been formed on the filter bags, the actual start-up of the boiler 1 with oil burning is initiated while the injection of the fly ash proceeds continuously. It may be mentioned here that the operation of the bag filter is adapted such that the fly-ash injection and the other functions of the filter are coordinated.

The condensate and the droplets consisting of hydrocarbon, sulphuric acid and water are taken up on the surface of the fly-ash particles in both the flue gases and in the dust cake formed. By this supply of finely-dispersed fly-ash particles the condensate and the droplets are diluted significantly in the considerably larger quantity of fly ash, present on the filter bags, of which the dust cake is substantially made up, instead of being deposited 100% directly on the filter bags and clogging and "cementing" these. In this way the problem of clogging and "cementing" of the filter bags is solved. This entails a considerably longer service life of the filter bags. The dust cake is separated from the bag filter 3 when the pressure drop across the filter bags has fallen to a predetermined value, according to the process, after the start-up, that is, during stationary operation of the boiler 1 with coal firing.

Thus, the filter bags need not be replaced nearly as often as before, which results in considerably lower service and maintenance costs.

Another advantage with the method according to the present invention is that it makes possible the use of fly ash produced by the plant itself, which also renders the method much less expensive.

The invention is not, of course, limited to the method described above, but may be modified in various ways within the scope of the appended claims.

The invention may also be applied to situations, corresponding to start-up of a boiler, where condensate arises. For example, it may be applied in case of operational disturbances in a coal-fired boiler, such as during a fault in the supply of coal to the boiler, in which case the boiler is automatically switched to 100% oil firing.

What is claimed is:

1. A method of cleaning flue gases from gaseous pollutants formed during combustion of oil during at least one of start-up of a boiler and operational disturbances in the boiler, wherein the boiler is for combustion of fuel including one of fossil fuel, coal, biomass fuel and waste, the method comprising:

conducting flue gases from the boiler through a flue duct to a barrier filter for separation of particulate pollutants;

introducing finely-dispersed particles into and mixing with the flue gases in the flue duct in at least one of upstream of and in the barrier filter; and separating the finely-dispersed particles in the barrier filter while forming a dust cake;

whereby condensed gaseous pollutants and droplets are taken up on the surface of the finely-dispersed particles in the flue gases and in the dust cake.

2. The method according to claim 1, wherein the barrier filter comprises a bag filter.

3. The method according to claim 1, wherein the gaseous pollutants and droplets comprise hydrocarbon, sulfuric acid and water.

4. The method according to claim 1, wherein the finely-dispersed particles are introduced in an amount of 1–500 g/Nm³ of flue gas.

5. The method according to claim 1, wherein the finely-dispersed particles are introduced in an amount of 5–50 g/Nm³ of flue gas.

6. The method according to claim 1, wherein the finely-dispersed particles comprise at least one of fly ash and bottom ash from the boiler.

7. The method according to claim 1, further comprising:
   taking the finely-dispersed particles from an external storage container.

8. The method according to claim 7, wherein the external storage container comprises a silo.

9. The method according to claim 1, wherein the barrier filter comprises a bag filter and the finely-dispersed particles comprise fly ash taken directly from at least one dust hopper associated with the bag filter.

10. The method according to claim 1, wherein the finely-dispersed particles comprise bottom ash taken directly from the boiler.

11. The method according to claim 1, wherein the finely-dispersed particles are introduced into and mixed with the flue gases upstream of an air preheater associated with the boiler.

* * * * *